United States Patent
Kuriaki

(10) Patent No.: US 9,261,761 B2
(45) Date of Patent: Feb. 16, 2016

(54) PROJECTION IMAGE DISPLAY DEVICE

(71) Applicant: Mitsubishi Electric Corporation, Tokyo (JP)

(72) Inventor: Makoto Kuriaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/297,747

(22) Filed: Jun. 6, 2014

(65) Prior Publication Data

US 2015/0198869 A1    Jul. 16, 2015

(30) Foreign Application Priority Data

Jan. 10, 2014 (JP) ................. 2014-002818

(51) Int. Cl.
| | |
|---|---|
| *G03B 21/16* | (2006.01) |
| *H01J 17/28* | (2006.01) |
| *G03B 21/20* | (2006.01) |
| *G03B 21/00* | (2006.01) |

(52) U.S. Cl.
CPC .............. *G03B 21/16* (2013.01); *G03B 21/005* (2013.01); *G03B 21/2013* (2013.01); *G03B 21/2033* (2013.01); *H01J 17/28* (2013.01)

(58) Field of Classification Search
CPC ......... G03B 21/16; G03B 21/26; H01J 17/28; H05B 37/02; H05B 37/00; G02F 1/1333
USPC ............ 353/52, 54, 57, 60, 61; 362/294, 345; 361/695
See application file for complete search history.

(56) References Cited

U.S. PATENT DOCUMENTS

| | | | | |
|---|---|---|---|---|
| 8,985,780 B2 * | 3/2015 | Bullwinkel | ............ | G03B 21/16 353/54 |
| 2006/0279706 A1 * | 12/2006 | Bash | ...................... | G03B 21/18 353/54 |
| 2010/0045940 A1 * | 2/2010 | Takagi | ................... | G03B 21/16 353/54 |
| 2011/0037954 A1 | 2/2011 | Tsuchiya et al. | | |
| 2013/0258295 A1 * | 10/2013 | Terashima | ............. | G03B 21/16 353/54 |
| 2013/0342765 A1 | 12/2013 | Asano | | |
| 2015/0226417 A1 * | 8/2015 | Hirose | ................... | F21V 29/51 353/54 |

FOREIGN PATENT DOCUMENTS

| | | |
|---|---|---|
| EP | 2 256 548 A1 | 12/2010 |
| JP | 2009-031430 A | 2/2009 |
| JP | 2009-42703 A | 2/2009 |
| JP | 2009-075236 A | 4/2009 |
| JP | 2009-85510 A | 4/2009 |
| JP | 2009-086272 A | 4/2009 |
| JP | 2009-222869 A | 10/2009 |
| JP | 2011-148428 A | 8/2011 |

* cited by examiner

*Primary Examiner* — William C Dowling
(74) *Attorney, Agent, or Firm* — Birch, Stewart, Kolasch & Birch, LLP

(57) ABSTRACT

A projection image display device includes an indoor unit to be located indoors and an outdoor unit to be located outdoors. The outdoor unit includes a second refrigerant piping that forms a loop refrigerant path in combination with a first refrigerant piping, a cooling device, and a cooling control circuit that controls cooling for R, G, B laser heat sinks by the cooling device. The indoor unit includes a main control circuit that communicates with the cooling control circuit to control the cooling by the cooling device.

6 Claims, 3 Drawing Sheets

F I G. 2
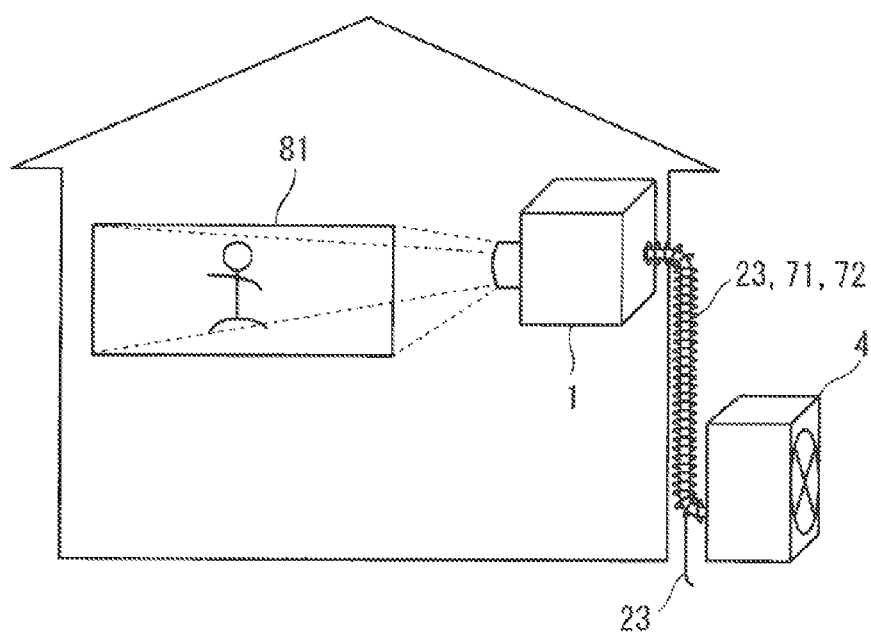

PROJECTION IMAGE DISPLAY DEVICE

BACKGROUND OF THE INVENTION

1. Field of the Invention

The present invention relates to a projection image display device that projects an image onto a screen and more particularly to cooling of the projection image display device.

2. Description of the Background Art

Conventionally, many projection image display devices (projectors) adopt lamps as light sources for generating light beams of three primary colors. These projection image display devices separate white light emitted from the lamps, into the three primary colors of red (R), green (G), and blue (B) by means of a dichroic mirror, and after modulating the three primary colors by image information and combining them by a combining prism, the projection image display devices project them onto a screen through a projection lens, to thereby display an image.

On the other hand, demands for higher-luminance (higher output power), a wider range of color reproduction, and a longer life have been increasing recently. However, promoting higher-luminance of the projection image display devices including the lamp light sources as described above is difficult in terms of an increase in heat generation and noise as well as an increase in size of a cooling structure and a power supply, and furthermore the wider range of color reproduction and the longer life are also difficult to be achieved.

Thus, in place of the lamp light sources, a semiconductor laser element and a light emitting diode (LED) that have a wide range of color reproduction and have a long life are being used as light sources. Moreover, the plurality of semiconductor laser elements and the plurality of LEDs are used as light source elements, so that developments of light sources capable of high output power and projection image display devices provided with the light sources are also promoted.

In the projection image display device using the semiconductor laser elements or the LEDs, for light emission and oscillation of the semiconductor laser elements or the LEDs of each color (R, G, B) with stability, their operating temperatures are needed to be maintained constant, which leads to an important task.

Particularly, in a case where the light source elements are the semiconductor laser elements, an efficiency of light emission increases as the operating temperature decreases, and on the other hand, as the operating temperature increases, the efficiency of light emission decreases and an increase in crystal defects also progresses. Moreover, an increase in heat generation corresponding to an increase in a non-radiative transition accompanied by the progression may further cause a temperature rise of a light-emitting element and accelerated decline of its light-emitting capability may occur. In addition, a shortening of life may progress rapidly. Furthermore, no matter how high or low an operating temperature is, a wavelength of an output light changes correspondingly to the operating temperature, whereby the original color and the image cannot be projected.

Thus, in a case where the light source elements are the semiconductor laser elements, it is important to maintain the operating temperature at a constant optimum temperature.

The conventional technique for stabilizing the operating temperature of the semiconductor laser elements is a cooling technique using a Peltier device. However, an air-cooled cooling is generally used for exhaust heat of the Peltier device, and a heat pipe, a heat sink, a fan, and the like in large size are needed to achieve a sufficient cooling capability by the air-cooled cooling for high output power, resulting in problems that a size of the device and noise by the fan increase. A loss of power by the Peltier device is large, and thus it is conceivable that power consumption is large and efficiency is poor.

Moreover, a cooling technique using a water cooling is another cooling technique, but due to a temperature differential between an upper stream and a lower stream, maintaining the operating temperature of the plurality of semiconductor laser elements constant is difficult.

As another cooling technique, for example, Japanese Patent Application Laid-Open No. 2009-222869 discloses the technique for supplying an optical element group with air that has exchanged heat to cool the optical element group. However, a volume of cooling air for the optical element group is unbalanced, and thus it is difficult to maintain the operating temperature constant. The technique disclosed in Japanese Patent Application Laid-Open No. 2009-222869 also requires a large fan for cooling, resulting in problems that a size of the device and noise by the fan increase.

In Japanese Patent Application Laid-Open No. 2009-42703, to solve the problems as mentioned above, the technique for using a refrigerant circuit including, for example, a refrigerant compressor, a condenser, a fan, a pressure reducer, and an evaporator (or a heat sink) to cool a semiconductor laser element by vaporization and latent heat of a refrigerant has been developed.

The technique of Japanese Patent Application Laid-Open No. 2009-42703 can maintain an operating temperature constant. However, as in the technique of Japanese Patent Application Laid-Open No. 2009-42703, in a projection image display device in which a circuit for projecting an image and a refrigerant circuit are integrated, sizes and weights of a compressor, a condenser, a fan, and a power supply increase as a high output is produced. Thus, size of a space for installing the projection image display device and load capacity thereof lead to a problem, resulting in an increase in cost of installation. Moreover, it is a problem that noise caused by upsizing of the fan or the compressor also increases.

SUMMARY OF THE INVENTION

The present invention has been made in view of the above-mentioned problems, and an object thereof is to provide a technique capable of suppressing a size and load capacity of a device to be located indoors while an operating temperature is maintained constant.

The present invention is a projection image display device that projects an image onto a screen, and it includes an indoor unit to be located indoors and to project the image and an outdoor unit to be located outdoors. The indoor unit includes at least one semiconductor laser element group that is a light source for the image and includes a plurality of semiconductor laser elements, a heat sink that includes a metal block thermally connected to the plurality of semiconductor laser elements, and a first refrigerant piping thermally connected to the heat sink. The outdoor unit includes a second refrigerant piping that forms a loop refrigerant path in combination with the first refrigerant piping through a refrigerant piping located between the indoor unit and the outdoor unit, a cooling device that includes a refrigerant compressor, a condenser, and a fan and that performs a cooling for the heat sink through a refrigerant circulating in the refrigerant path, and a cooling control circuit that controls the cooling by the cooling device. The indoor unit further includes a main control circuit that communicates with the cooling control circuit through a communication path located between the indoor unit and the outdoor unit to control the cooling by the cooling device.

A size and load capacity of a device to be located indoors can be suppressed while an operating temperature of a semiconductor laser element group is maintained constant.

These and other objects, features, aspects and advantages of the present invention will become more apparent from the following detailed description of the present invention when taken in conjunction with the accompanying drawings.

BRIEF DESCRIPTION OF TILE DRAWINGS

FIG. 2 is a perspective view showing an example of installing the projector according to the first preferred embodiment.

DESCRIPTION OF THE PREFERRED EMBODIMENT

First Preferred Embodiment

Figure 1:
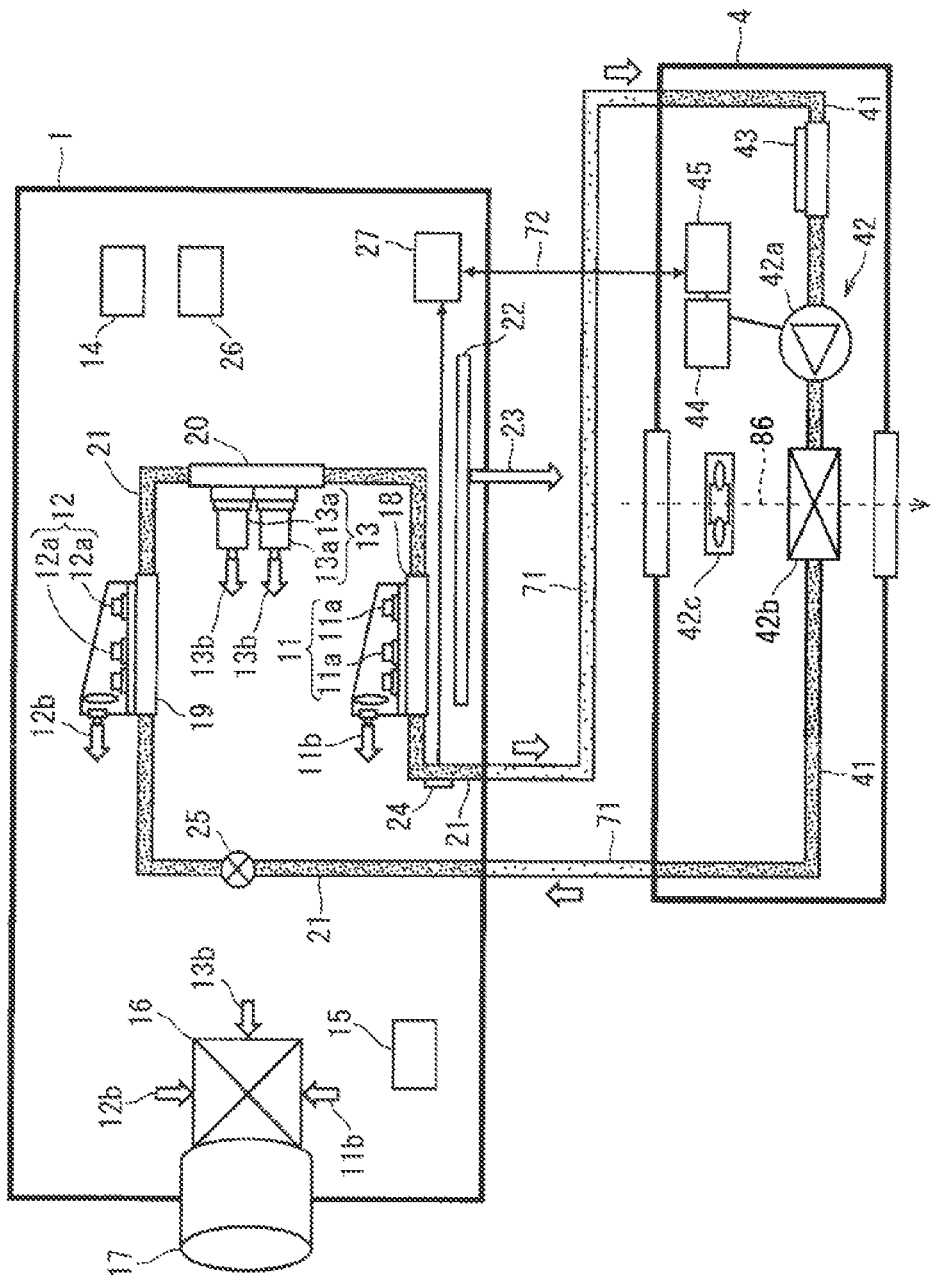
FIG. 1 is a diagram showing an overall configuration of a projector according to a first preferred embodiment.

FIGS. 1 and 2 are diagrams showing configurations of a projection image display device according to a first preferred embodiment of the present invention. The projection image display device (hereinafter, referred to as a "projector") is a device that projects an image (projection light) onto a screen 81. As shown in FIGS. 1 and 2, the projector includes an indoor unit 1 to be located indoors and an outdoor unit 4 to be located outdoors.

The indoor unit 1 is a unit that projects the above-mentioned image. The indoor unit 1 according to the first preferred embodiment includes R, G, B laser clusters 11, 12, 13, a laser drive circuit 14, an image processing circuit 15, an optical combining part 16, a projection lens 17, R, G, B laser heat sinks 18, 19, 20, a first refrigerant piping 21, a saucer 22, a drain pipe 23, a temperature control sensor 24, an electronic expansion valve 25, a power circuit 26 supplying power used for structural components of the indoor unit 1, and a main control circuit 27 collectively controlling the structural components of the indoor unit 1. Moreover, the indoor unit 1 also includes, for example, an image generation part, which modulates laser light to generate an image, and the like, but they are omitted to be shown in FIGS. 1 and 2.

The outdoor unit 4 according to the first preferred embodiment includes a second refrigerant piping 41, a cooling device 42, a refrigerant heater 43, an inverter circuit 44, and a cooling control circuit 45 collectively controlling structural components of the outdoor unit 4. Among those, the cooling device 42 is provided with a refrigerant compressor 42a, a condenser 42b, and a fan 42c. Moreover, the outdoor unit 4 also includes, for example, a power circuit supplying power used for the structural components of the outdoor unit 4 and the like, but they are omitted to be shown in FIGS. 1 and 2.

A refrigerant piping 71 and a communication line 72 serving as a communication path are located between the indoor unit 1 and the outdoor unit 4. The refrigerant piping 71 connects one end of the first refrigerant piping 21 to one end of the second refrigerant piping 41 and connects the other end of the first refrigerant piping 21 to the other end of the second refrigerant piping 41. The communication line 72 communicatably connects the main control circuit 27 to the cooling control circuit 45. Here, a configuration using a cable (communication line 72) for the communication path will be described, but the communication path is not limited to this. For example, if the main control circuit 27 and the cooling control circuit 45 are provided with a radio communication device, the configuration may use a wireless communication path.

Configuration Mainly Related to Image Projection

Next, a configuration mainly related to an image projection of the projector according to the first preferred embodiment will be described in detail.

The R laser cluster (semiconductor laser element group) 11 is a light source for an image (projection light) and includes a plurality of semiconductor laser elements 11a capable of outputting red laser light 11b. The G laser cluster (semiconductor laser element group) 12 is a light source for an image (projection light) and includes a plurality of semiconductor laser elements 12a capable of outputting green laser light 12b. The B laser cluster (semiconductor laser element group) 13 is a light source for an image (projection light) and includes a plurality of semiconductor laser elements 13a capable of outputting blue laser light 13b. With this configuration, the R, (B laser clusters 11, 12, 13 can output the red laser light 11b, the green laser light 12b, and the blue laser light 13b having high light intensity, respectively.

The laser drive circuit 14 drives the semiconductor laser elements 11a, 12a, 13a of the R, G, B laser clusters 11, 12, 13, so that they output the red laser light 11b, the green laser light 12b, and the blue laser light 13b.

The image processing circuit 15 outputs an image signal in response to image information from an external source to the image generation part which is not shown. The image generation part modulates the red laser light 11b, the green laser light 12b, and the blue laser light 13b based on the image signal from the image processing circuit 15 to generate a red image, a green image, and a blue image.

The optical combining part 16 combines the red image, the green image, and the blue image which have been generated to generate a color image (projection light).

The projection lens 17 projects the color image (projection light) generated by the optical combining part 16 onto the screen 81 (FIG. 2) such that the color image (projection light) is enlarged.

Configuration Mainly Related to Cooling

Next, a configuration mainly related to cooling of the projector according to the first preferred embodiment will be described in detail.

The R laser heat sink (heat sink) 18 includes a metal block thermally connected (bonded) to the plurality of semiconductor laser elements 11a. The G laser heat sink (heat sink) 19 includes a metal block thermally connected to the plurality of semiconductor laser elements 12a. The B laser heat sink (heat sink) 20 includes a metal block thermally connected to the plurality of semiconductor laser elements 13a.

The first refrigerant piping 21 is thermally connected to the R, G, B laser heat sinks 18, 19, 20 (here, the metal blocks thereof). As shown in FIG. 1, the electronic expansion valve 25, the G laser heat sink 19, the B laser heat sink 20, and the R laser heat sink 18 in the stated order are connected in series through the first refrigerant piping 21.

The saucer 22, the drain pipe 23, the temperature control sensor 24, the electronic expansion valve 25, and the main control circuit 27 of the indoor unit 1 will be described later in detail, and the structural components of the outdoor unit 4 will be described next in detail.

The second refrigerant piping 41 forms a loop refrigerant path in combination with the first refrigerant piping 21 through the refrigerant piping 71. As shown by solid arrows in FIG. 1, the refrigerant circulates in the loop refrigerant path through the one end of the electronic expansion valve 25, the G laser heat sink 19, the B laser heat sink 20, the R laser heat sink 18, the refrigerant heater 43, the refrigerant compressor 42a, the condenser 42b, and the other end of the electronic expansion valve 25 in the stated order.

The cooling device 42 is provided with the refrigerant compressor 42a, the condenser 42b, and the fan 42c, and the cooling device 42 can dissipate heat of the refrigerant flowing through the second refrigerant piping 41.

Specifically, the refrigerant compressor 42a compresses the refrigerant gas (refrigerant in a gas state) to increase temperature and pressure of the refrigerant gas. The condenser 42b exchanges heat between the refrigerant gas at high temperature and high pressure and an outside air 86 (arrow shown by a dashed line in FIG. 1) which flows in the outdoor unit 4 from the outside thereof by the fan 42c, to thereby convert the refrigerant gas into a high-pressure liquid refrigerant. The outside air 86 subjected to the heat generated by the condensation effect of the refrigerant is dissipated to the outside of the outdoor unit 4 from the inside thereof by the fan 42c.

The high-pressure liquid refrigerant is decompressed before reaching the G laser heat sink 19 or the like to be the liquid refrigerant which is easily vaporized. The decompression of the refrigerant may be achieved by contriving the piping structure of the refrigerant path, for example, and here, it is achieved by the electronic expansion valve 25.

According to the configuration as described above, in the portion from the one end of the electronic expansion valve 25, the G laser heat sink 19, the B laser heat sink 20, the R laser heat sink 18, and to the refrigerant heater 43 in the refrigerant path, the R, G, B laser heat sinks 18, 19, 20 are maintained at constant temperatures by a latent heat effect while losing the heat. In this manner, the cooling device 42 can perform a cooling for the R, G, B laser heat sinks 18, 19, 20 as well as the R, G, B laser clusters 11, 12, 13 to certain constant temperatures through the refrigerant circulating in the refrigerant path.

If the refrigerant in a state of not being completely vaporized flows into the refrigerant compressor 42a, the refrigerant compressor 42a is adversely affected. Thus, the refrigerant heater 43 heats the refrigerant flowing into the refrigerant compressor 42a, so that the refrigerant in a state of being vaporized can flow into the refrigerant compressor 42a.

The inverter circuit 44 drives the refrigerant compressor 42a by control of the cooling control circuit 45.

The cooling control circuit 45 controls the inverter circuit 44 to control the drive of the refrigerant compressor 42a. The cooling control circuit 45 with this configuration can control the cooling by the cooling device 42. The cooling control circuit 45 controls not only the drive of the refrigerant compressor 42a but also it may control the number of revolutions of the fan 42c or the like to control the cooling by the cooling device 42.

Next, the saucer 22, the drain pipe 23, the temperature control sensor 24, the electronic expansion valve 25 and the main control circuit 27 of the indoor unit 1 will be described in detail.

The saucer 22 receives water droplets caused by dew condensation inside of the indoor unit 1 in a case where the temperature of the inside of the indoor unit 1 is lower than room temperature, for example. The drain pipe 23 discharges the water received with the saucer 22 to the outside of the indoor unit 1.

The temperature control sensor (temperature sensor) 24 is provided to the first refrigerant piping 21 in downstream side from the R, G, B laser heat sinks 18, 19, 20, and the temperature control sensor 24 can indirectly detect the temperatures of the R, G, B laser heat sinks 18, 19, 20 as well as the operating temperatures of the R, G, B laser clusters 11, 12, 13. The temperature control sensor 24 outputs the detected temperatures to the main control circuit 27.

The electronic expansion valve 25 serving as a decompressor is provided to the first refrigerant piping 21 in upstream side from the R, G, B laser heat sinks 18, 19, 20. The electronic expansion valve 25 controls the amount of decompression of the refrigerant in the first refrigerant piping 21 to control evaporation temperature of the refrigerant and can perform a cooling for the R, G, B laser heat sinks 18, 19, 20 by the latent heat effect of the refrigerant.

The main control circuit 27 communicates with the cooling control circuit 45 through the communication line 72. In the first preferred embodiment, the main control circuit 27 communicates such that information, for example, control information is transmitted to the cooling control circuit 45, to thereby control the cooling control circuit 45. Thus, the main control circuit 27 can control the cooling by the cooling device 42 (inverter circuit 44).

Moreover, the main control circuit 27 controls the cooling by the cooling device 42 to maintain the temperature detected by the temperature control sensor 24 at a predetermined temperature. The configuration of having a lookup table which brings temperature detected by the temperature control sensor 24 into correspondence with a control signal for controlling the cooling by the cooling device 42 and obtaining the control signal corresponding to the temperature from the temperature control sensor 24 from the lookup table is used as the main control circuit 27 described above.

Effects

In a projector configured to use a plurality of semiconductor laser elements as a light source component, life of the semiconductor laser elements, wavelength of an outputted light, and luminance of the outputted light are generally affected by an operating temperature. Thus, if the operating temperature is not maintained constant, white balance or luminance of the projector, for example, differs from a design value, which has an effect such that color gradation is not accurately expressed. In this respect, the projector has been required to maintain the operating temperature constant. Moreover, to achieve this requirement, a technique in which all of the refrigerant circuit for maintaining the operating temperature constant is provided inside the projector has been developed, but sizes and weights of a compressor, a condenser, a fan, and a power supply increase as the semiconductor laser elements produce a high output, and thus size of a space for installing the projector and load capacity thereof as well as magnitude of noise of the fan and the compressor lead to problems. Furthermore, it is also a problem that costs of measures against reinforcement of installation equipment increase.

In contrast, in the projector according to the first preferred embodiment as described above, the main control circuit 27 communicates with the cooling control circuit 45 to control the cooling (latent heat action of the refrigerant of the first refrigerant piping 21) by the cooling device 42. Thus, a temperature detected by the temperature control sensor 24 can be maintained at a predetermined temperature, for example. Therefore, even if the amount of heat generated by the R, G, B laser clusters 11, 12, 13 changes as luminance of the projector changes, operating temperatures of the R, G, B laser clusters 11, 12, 13 can be maintained constant. Consequently, luminance and white balance of the projector can be stabilized.

In the first preferred embodiment, the cooling device 42 including the refrigerant compressor 42a, the condenser 42b, and the fan 42c is configured to be located in the outdoor unit 4. In this manner, the structural components of the projector are distributed into the indoor unit 1 and the outdoor unit 4 to be located, which allows for weight reduction of the indoor unit 1. As a result, flexibility in installation such as suspension from a ceiling can be increased, and also load capacity reinforcement construction of the inside accompanied by an increase in weights of the refrigerant compressor 42a and the fan 42c, additional discharge equipment accompanied by an increase in the amount of exhaust hot air, and these costs can be suppressed. Moreover, in a case where a projector is equipped inside buildings such as a movie theater, locating the outdoor unit 4 outdoors and a work to equip a hole (path) for providing the refrigerant piping 71, the communication line 72, and the drain pipe 23 inside a building are sufficient, so that most of the equipment inside the building can conceivably be used. Furthermore, the refrigerant compressor 42a and the fan 42c are located outdoors, so that noise caused by vibration thereof and wind noise caused by the fan 42c can be suppressed to be transmitted to a viewer inside the rooms where the indoor unit 1 is located.

In the first preferred embodiment, the drain pipe 23 that discharges water generated by dew condensation inside the indoor unit 1 to the outside of the indoor unit 1 is provided. Thus, the operating temperatures of the R, G, B laser clusters 11, 12, 13 can be controlled to be maintained at temperatures of about 15° C., for example, at which dew condensation is easily generated. As a result, while an efficiency of light emission of the semiconductor laser elements 11a, 12a, 13a can be increased, life thereof can also be extended. The indoor unit 1 may further include, inside of the indoor unit 1, a dehumidifier (not shown) connected to the drain pipe 23.

First Modification

In the configuration of the first preferred embodiment, the main control circuit 27 may also control the electronic expansion valve 25, to thereby finely adjust the cooling for the R, G, B laser heat sinks 18, 19, 20 by the electronic expansion valve 25. With this configuration, response speed of temperatures in the R, G, B laser heat sinks 18, 19, 20 can be improved.

Figure 3:
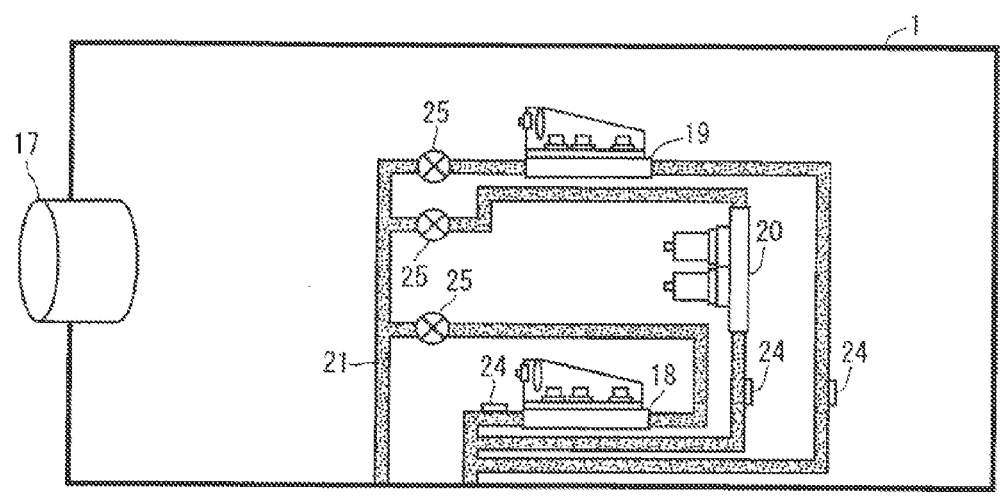
FIG. 3 is a diagram showing a configuration of a portion of a projector according to a first modification of the first preferred embodiment.

Moreover, in the configuration of the first preferred embodiment, the G laser heat sink 19, the B laser heat sink 20, and the R laser heat sink 18 are connected in the stated order and in series through the first refrigerant piping 21. However, this is not restrictive, and the R, G, B laser heat sinks 18, 19, 20 may be connected in parallel through the first refrigerant piping 21. The plurality of electronic expansion valves 25 (herein, three) controlled by the main control circuit 27 may be provided to correspond to the R, G, B laser clusters 11, 12, 13 on one-to-one basis. The plurality of the temperature control sensors 24 (herein, three) may be provided to the first refrigerant piping 21 in downstream side from each of the R, G, B laser heat sinks 18, 19, 20. This configuration is shown in FIG. 3. However, to avoid complication of the diagram, FIG. 3 shows only a portion of the indoor unit 1.

In the configuration as shown in FIG. 3, the operating temperatures of the R, G, B laser clusters 11, 12, 13 can be individually adjusted.

As described above, the electronic expansion valves 25 are located in the indoor unit 1, but this is not restrictive and they may be located in the outdoor unit 4 (for example, be provided to the second refrigerant piping 41 in downstream side from the condenser 42b). And similarly to the cooling device 42, the main control circuit 27 may be configured to communicate with the cooling control circuit 45 to control the electronic expansion valves 25.

Second Modification

The indoor unit 1 according to the first preferred embodiment includes the temperature control sensor 24 provided to the first refrigerant piping 21 in downstream side from the R, G, B laser heat sinks 18, 19, 20. However, this is not restrictive, and the indoor unit 1 may include temperature sensors detecting temperatures of joints (pn junctions) of the semiconductor laser elements 11a, 12a, 13a, instead of the temperature control sensor 24. The main control circuit 27 may control the cooling by the cooling device 42 to maintain the temperatures detected by the temperature sensors at predetermined temperatures.

With this configuration, even if the amount of heat generated by the semiconductor laser elements 11a, 12a, 13a changes as luminance of the semiconductor laser elements 11a, 12a, 13a changes, the operating temperatures of the semiconductor laser elements 11a, 12a, 13a can be maintained constant. Therefore, a change in wave lengths of the red laser light 11b, the green laser light 12b, and the blue laser light 13b caused by a change in the operating temperatures can be suppressed more reliably.

According to the present invention, the preferred embodiments and the modifications can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A projection image display device that projects an image onto a screen, comprising:
an indoor unit to be located indoors and to project said image; and
an outdoor unit to be located outdoors, wherein
said indoor unit includes:
at least one semiconductor laser element group that is a light source for said image and includes a plurality of semiconductor laser elements;
a heat sink that includes a metal block thermally connected to said plurality of semiconductor laser elements; and
a first refrigerant piping thermally connected to said heat sink,
said outdoor unit includes:
a second refrigerant piping that forms a loop refrigerant path in combination with said first refrigerant piping through a refrigerant piping located between said indoor unit and said outdoor unit;
a cooling device that includes a refrigerant compressor, a condenser, and a fan and performs a cooling for said heat sink through a refrigerant circulating in said refrigerant path; and a cooling control circuit that controls said cooling by said cooling device, and said indoor unit further includes a main control circuit that communicates with said cooling control circuit through a communication path located between said indoor unit and said outdoor unit to control said cooling by said cooling device.

2. The projection image display device according to claim 1, wherein
said indoor unit further includes a temperature sensor provided to said first refrigerant piping in downstream side from said heat sink, and
said main control circuit controls said cooling by said cooling device to maintain a temperature detected by said temperature sensor at a predetermined temperature.

3. The projection image display device according to claim 1, wherein
said indoor unit further includes temperature sensors detecting temperatures of joints of said semiconductor laser elements, and
said main control circuit controls said cooling by said cooling device to maintain temperatures detected by said temperature sensors at predetermined temperatures.

4. The projection image display device according to claim 1, wherein
said indoor unit further includes at least one electronic expansion valve that is provided to said first refrigerant piping in upstream side from said heat sink and performs a cooling for said heat sink through a refrigerant circulating in said refrigerant path, and
said main control circuit controls said at least one electronic expansion valve to finely adjust said cooling by said electronic expansion valve.

5. The projection image display device according to claim 4, wherein
the plurality of semiconductor laser element groups are connected in parallel through said first refrigerant piping, and
the plurality of electronic expansion valves are provided to correspond to said plurality of semiconductor laser element groups on one-to-one basis.

6. The projection image display device according to claim 1, wherein said indoor unit further includes a drain pipe discharging water generated by dew condensation inside said indoor unit to the outside of said indoor unit.

* * * * *